US009118588B2

(12) United States Patent
Louis et al.

(10) Patent No.: US 9,118,588 B2
(45) Date of Patent: Aug. 25, 2015

(54) VIRTUAL CONSOLE-PORT MANAGEMENT

(71) Applicant: Cisco Technology, Inc., San Jose, CA (US)

(72) Inventors: Yves Louis, Mougins Cedex (FR); Patrick Wetterwald, Mouans Sartoux (FR); Patrick Grossetete, Marcoussis (FR); Maurizio Portolani, Rolle (CH)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 13/721,738

(22) Filed: Dec. 20, 2012

(65) Prior Publication Data

US 2014/0181279 A1    Jun. 26, 2014

(51) Int. Cl.
| | |
|---|---|
| *H04L 12/24* | (2006.01) |
| *H04W 12/02* | (2009.01) |
| *H04W 12/06* | (2009.01) |
| *H04L 12/28* | (2006.01) |
| *H04L 29/06* | (2006.01) |

(52) U.S. Cl.
CPC ............ *H04L 41/28* (2013.01); *H04L 12/2807* (2013.01); *H04W 12/02* (2013.01); *H04W 12/06* (2013.01); *H04L 63/0272* (2013.01)

(58) Field of Classification Search
CPC .................................. H04L 12/24; H04L 9/08
USPC .................................................. 709/220, 222
See application file for complete search history.

(56) References Cited

U.S. PATENT DOCUMENTS

| | | | |
|---|---|---|---|
| 7,904,599 B1 | 3/2011 | Bennett | |
| 7,921,686 B2 | 4/2011 | Bagepalli et al. | |
| 8,144,699 B2 | 3/2012 | Vinneras | |
| 8,422,401 B1* | 4/2013 | Choong et al. | 370/254 |
| 2003/0228874 A1* | 12/2003 | Mallette | 455/508 |
| 2010/0306334 A1* | 12/2010 | DeHaan et al. | 709/208 |
| 2011/0066374 A1* | 3/2011 | Hartman et al. | 701/209 |
| 2011/0242975 A1* | 10/2011 | Zhao et al. | 370/230 |
| 2012/0324533 A1* | 12/2012 | Conway et al. | 726/1 |
| 2014/0077944 A1* | 3/2014 | Baskin et al. | 340/539.1 |
| 2014/0119233 A1* | 5/2014 | Palani | 370/254 |

* cited by examiner

*Primary Examiner* — Brian J Gillis
*Assistant Examiner* — Steve Lin
(74) *Attorney, Agent, or Firm* — Edell, Shapiro & Finnan, LLC (57) ABSTRACT

Techniques are providing for managing and optimizing the configuration of network devices. At a management device in a network, a message is received from a first network device via a wireless link or a power line communication link between the management device and the first network device. The new network device is classified as belonging to one of a plurality of network device zones based on evaluating the message. A response message is then sent to the new network device via the wireless link or the power line communication link to ensure secure access to a virtual console-port is provided for the management device and the network devices in the network device zones.

17 Claims, 9 Drawing Sheets

VIRTUAL CONSOLE-PORT MANAGEMENT

TECHNICAL FIELD

The present disclosure relates to managing and optimizing configuration of devices in a network.

BACKGROUND

Typically, any networking, computing and/or storage device may offer two types of networks: a data network used for data communications and a management network used for management communications. When a new device joins a network or a data center, a dedicated connection is usually required between the console-port of the new device and a terminal that is used to configure the new device (e.g., by a network administrator). Usually, this dedicated connection may be an asynchronous connection for management purposes in order to configure a minimum number of network parameters of the new device so that the new device can exchange data communications in the network. In order to allow the terminal to access the console-port of the new device, each console-port of the new device may be physically connected to a terminal server (TS) typically to ease operational production. A TS may be located as a Top of Rack (ToR) TS within a rack unit that houses many network devices, each having a console-port, and the ToR TS in each rack unit may aggregate several console-ports of multiple devices within that particular rack unit. Thus, each console-port from each network device is connected to its respective ToR TS. A virtual console-port eliminates the need to use the physical console-ports for management. This reduces the need to deploy a physical TS for every rack unit.

DESCRIPTION OF EXAMPLE EMBODIMENTS

Overview

Techniques are providing for managing and optimizing the configuration of network devices. The techniques may be embodied as a method, an apparatus or a computer-readable media that is operable to perform the method. At a management device in a network, a message is received from a new network device in a network via a wireless link between the management device and the new network device or via a power line communication link between the management device and the new network device. The new network device is classified as belonging to one or a plurality of network device zones based on evaluating the message. A response message is then sent to the new network device via the wireless link or the power line communication link to ensure secure access to a virtual console-port is provided for the management device and network devices in the network device zones.

Additionally, a first network device receives a message from a second network device in the network. The message includes an authentication key and a network device zone identifier. The message from the first device is sent with the authentication key and the network device zone identifier to a management device in the network via the wireless link or the power line communication link. The first network device receives a response message from the management device in the network via the wireless communication link or the power line communication link.

Furthermore, a new network device sends a broadcast request message to a management device in the network via the wireless link or the power line communication link. The broadcast request message comprises an indication that the network device is not assigned to a network device zone. A response message is received from the management device via the wireless link or the power line communication link, wherein the response message comprises address identifier information if the network device is not preconfigured with address information and information indicating a new network device zone to which the network device is assigned to ensure secure access to a virtual console-port is provided for the management device and the network device.

Example Embodiments

Figure 1:
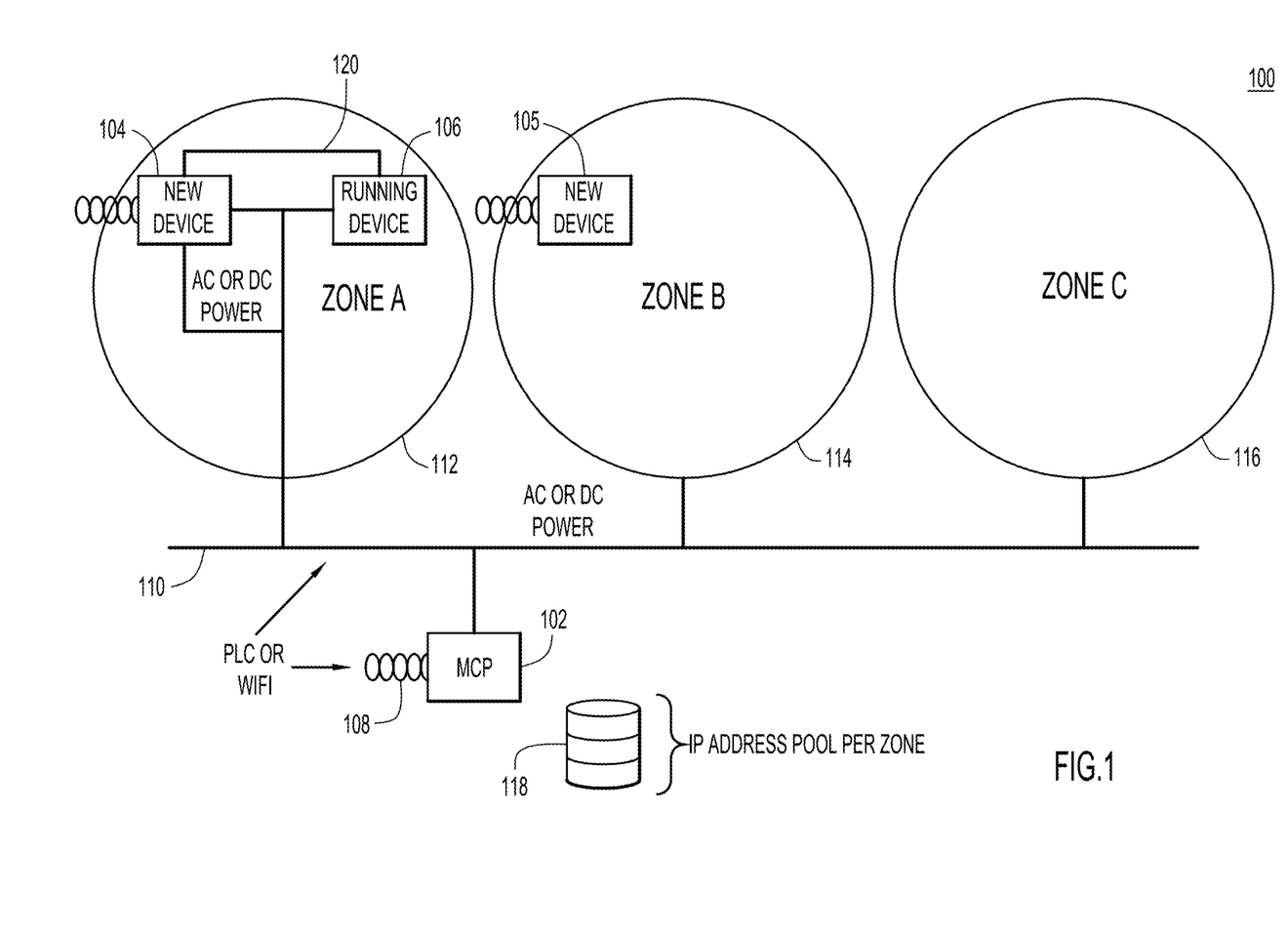
FIG. 1 shows an example network topology that includes a management device capable of configuring network devices using a power line communication link or a wireless link.

The techniques described herein relate to managing and optimizing configurations of network devices. Reference is first made to FIG. 1, which shows an example network or data center at reference numeral 100. The network 100 comprises a management device 102 (also referred to herein as a "management console," "management console platform" or "MCP"). The management device 102 may be any server that is able to communicate with devices in the network 100 to configure or provision network devices with communication parameters.

The network 100 also has a plurality of network devices, shown at reference numerals 104, 105 and 106. The network devices 104-106 may reside in one or more rack units and may be routers, servers, computers, etc. that are configured to exchange communications (e.g., data packets) with each other and with the management device 102. In particular, as described herein, the network devices 104-106 are configured to send configuration requests to the management device 102 and to receive configuration instructions from the management device 102. Additionally, the network devices 104-106 may later receive communications from the management device 102 for console access of the network devices 104-106 (e.g., for troubleshooting, reconfiguration, etc. of the network devices after the initial configuration has occurred). The network devices 104-106 may exchange these communications with the management device 102 via a wireless link, shown at reference numeral 108, or via a power communication link, shown at reference numeral 110, as described by the techniques herein. It should be appreciated that the wireless link 108 may be a Wi-Fi® or other wireless communication link that is capable of supporting the wireless transmission of configuration request messages and configuration messages. It should also be understood that the power communication link 110 may be any link that is capable of delivering alternating current (AC) or direct current (DC) power from the management device 102 to the network devices 104-106. Additionally, the power communication link 110 is capable of carrying configuration messages and configuration request messages between the management device 102 and the network devices 104-106. In general, as described herein, network device 106 is a network device that has previously joined the network 100 (e.g., a "running device") and that has already been configured by the management device 102. Additionally, it should be understood that network device 104 and network device 105 are "new" network devices that are attempting to join the network 100 and are to be configured by the management device 102 according to the techniques described herein.

The network 100 in FIG. 1 also shows a plurality of network device zones ("zones"). Zone A is shown at reference numeral 112, Zone B is shown at reference numeral 114 and Zone C is shown at reference numeral 116. The network device zones 112, 114 and 116 define a particular group or family of network devices in the network 100. For example, network devices 104 and 106 are classified in Zone A, network device 105 is classified in Zone B and no network device currently exists in Zone C in this example. It should be appreciated that other network devices may join the network, and different network devices and different rack units of network devices may be classified in Zone A, Zone B or Zone C. In one example, the network device zones 112, 114 and 116 may define a particular geographic area (e.g., particular buildings or particular areas within a building), and network devices and/or rack units of different network devices residing in these particular geographic areas may belong to corresponding network device zones. In another example, the network device zones 112, 114 and 116 may not be limited to a particular geographic area, and network devices within a same geographic area may belong to a same or different network device zone (i.e. different teams or subsidiaries working on the same building and sharing the same data center infrastructure). In FIG. 1, the network device 106 that has previously joined the network 100 is associated with Zone A, and thus, Zone A may be referred to herein as an "existing network zone" or "existing network device zone." Likewise, no network devices that previously joined the network exists in Zone B or in Zone C, and thus, Zone B and Zone C may be referred to herein as a "new network zone" or a "new network device zone."

FIG. 1 also shows an optional database 118. The database 118 may be stored in a memory component of the management device 102 or may be stored remotely from the management device 102. The database 118 is configured to store a plurality of addresses (e.g., IP addresses) that are associated with each network device zone. As network devices are added to the network 100, they may be already preconfigured with IP version 6 (IPv6 link-local) addresses (also referred to as "IPv6 link-local addresses" or "IPv6 L-L addresses") or may not be preconfigured with any IP address information. If the network devices are already preconfigured with IPv6 link-local address, the database 118 is not used to assign IP addresses to these network device (since they already have assigned IP addresses). If the network devices are not preconfigured with IP address information, IP version 4 (IPv4) addresses may be obtained from the database 118 that may store multiple IPv4 addresses. These addresses can be assigned to network devices in Zone A, Zone B and Zone C.

When necessary (i.e., when the network devices are not preconfigured with IP address information), the management device 102 is configured to access the optional database 118 to assign IP addresses (e.g., IPv4 addresses) to the devices in the network 100 in response to receiving a configuration request from a network device.

For example, as described herein, upon joining the network 100, network device 104 and network device 105 may send configuration requests to the management device 102 (via the wireless link 108 or the power line communication link 110) informing the management device 102 of the network device zones in which they are located, and in response, the management device 102 may send configuration messages to network device 104. If necessary, the management device 102 may also assign corresponding Internet Protocol (IP) addresses to network device 105 if it is not preconfigured with an IP address. Upon receiving the IP address assignments from the management device 102, network device 104 and network device 105 can each use its assigned IPv6 L-L address (if it exists) to communicate with other network devices (e.g., with each other and with network device 106) in the network 100.

Traditionally, when a device joins a network or data center, the device receives configuration messages from a management device 102 (e.g., a terminal) via a physical connection between it and the management device 102. The device may also receive configuration messages from a Top of Rack (ToR) Terminal Server (TS) device that is associated with a particular rack unit in which the device resides or is added. In one example, the physical connection is a cable (e.g., copper wire) that is connected to a port (e.g., a "console-port") of the device and to a port on the management device 102. Configuration messages are exchanged between the network device and the management device 102 or the TS device via cables. In this traditional data center configuration, every time a new device is added to a network, a new physical connection is required between the console-port of the new device and the management device. The requirement of these physical connections can be problematic since the cables forming the physical connection may consume a significant amount of space and power, as well as set-up and configuration time. That is, the requirement of cables for the physical connections can complicate the network topology of the data center. For example, if ten new devices are added to a data center, in order to configure the ten devices according to existing techniques, ten cables would be needed to interface with ten console-ports on the new devices and ten ports on the TS up to the management device. As stated above, these existing techniques complicate the network topology and limit the scalability of the data center as even more devices are added.

The techniques described herein overcome these shortcomings by simplifying the data center topology while maintaining network security protocols and implementations within the data center. In particular, the techniques described herein utilize an existing wireless link and/or a power line communication link between the management device 102 and other devices in the network to send configuration messages and console access messages without requiring additional physical connections between the management device and the devices in the network. That is, typically, since the management device 102 and network devices (e.g., network device 104 and 106) may be wireless enabled devices (e.g., configured to send and receive Wi-Fi® communications), the techniques described herein utilize the wireless capabilities of these devices to send and receive configuration messages between the management device 102 and the network devices via the wireless link 108. The configuration messages and console access messages may be sent using a secured tunnel (e.g., an Advanced Encryption Service (AES) tunnel). It should be appreciated that, in one example, sending these messages over the wireless link 108 may be advantageous due to the enhanced security, quality of communications, cost of production, etc. of the wireless link 108.

Additionally, the power line link 110 already exists in order to deliver power (AC or DC power) to the devices. Additionally, as new devices are added to the network, the new devices are connected to the power line link 110 to enable the new devices to receive the AC or DC power. The techniques described herein leverage this already-existing connection or link to send and receive configuration messages between the management device 102 and the network devices via the power line communication link 110. That is, in one implementation of the techniques herein, the power line link 110 is used both to deliver AC power and DC power to the network devices as well as to send configuration messages to the network devices.

It should be appreciated that the power line communication link 110 may be a power line carrier (PLC) link, and every device that joins the network 100 may have a PLC adapter to carry the console-port (configuration) traffic through the power line communication link 110. It should also be appreciated that when the configuration messages are sent via the power line communication link 110, the communications may be encrypted using, for example, AES protocols. It should be appreciated that other methods of encryption can also be used to secure traffic via an open network, and the AES protocols are not intended to be limiting. Thus, the configuration messages and console access messages cannot be intercepted and access to the console-port cannot be acceded by unauthorized equipment.

In either or both implementations (utilizing the wireless link 108 and/or the power line communication link 110 to exchange the configuration messages and console access messages), the techniques herein reduce the requirement for additional cables in the data center topology between the management device 102 and network devices (and/or between the TS and network devices). In either or both implementations the techniques also reduces the operational time to deploy as the techniques prevent the need to install any TS as top of rack. When the configuration messages are exchanged between the management device 102 and the devices in the network 100 via the wireless link 108 or the power line communication link 110, a virtual console-port on each of the devices in the network is presented to the management device 102 to enable the management device to remotely access the physical console-ports of each device to appropriately configure the device (e.g., to send the IP address information to each device if the devices do not have preconfigured IP addresses assigned to it). Thus, the techniques described herein involve presenting the virtual console-port on each of the devices to the management device 102 to perform the configuration of the devices.

As stated above, the network 100 may have several network device zones (Zone A, Zone B and Zone C in FIG. 1). As new devices join the network 100, the new devices may join a network device zone that already has other network devices associated with that network device zone, or the new devices may join a network device zone that does not have any network device associated with it. As stated above, these new devices might be preconfigured with IPv6 link-local address information (e.g., in a factory presetting) or might not be preconfigured with any IP address information. Thus, configuration messages may be sent to these new network devices via either the wireless link 108 or the power line communication link 110 (or both) in two scenarios: (a) First scenario—when a new network device joins the network 100 with a preconfigured IP address; and (b) Second scenario—when a new network device joins the network 100 without a preconfigured IP address.

In each scenario, the network device may join the network in either an already existing network device zone (e.g., network device 104 joining Zone A that already has network device 106 in FIG. 1) or may join the network in a new network device zone (e.g., network device 105 joining Zone B that does not have any network devices assigned to it in FIG. 1). The first scenario is described in more detail hereinafter in connection with FIG. 2 and FIGS. 3A and 3B, and the second scenario is described in more detail hereinafter in connection with FIG. 4 and FIGS. 5A and 5B. It should be appreciated that in each of these scenarios, configuration messages may be exchanged between the management device 102 and the new network device via either the wireless link 108 or the power line communication link 110 (or both) as described above. In general, it should also be appreciated that in one example, the goal of these techniques is to remove heavy, time consuming, power consuming and costly configuration steps by replacing the traditional console-port dedicated for management of network devices by a secure method (wireless or power line communications), thus removing the need to deploy additional terminal servers in the network 100.

Figure 2:
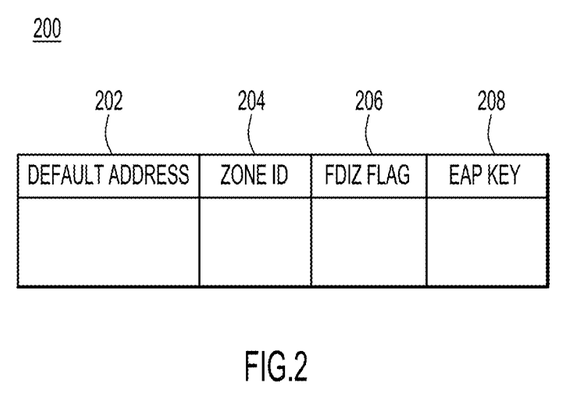
FIG. 2 shows an example of a configuration request message that is exchanged between a network device with a preconfigured address and the management device.

First Scenario:

Reference is now made to FIG. 2. FIG. 2 shows an example configuration request message 200 that is sent by a new device that joins the network 100 and the management device 102 in the first scenario. As stated above, in the first scenario, the new device joins the network 100, and it is preconfigured with an IPv6 Link-Local address (e.g., with factory presettings). In one example, the new device is preconfigured with an IPv6 link-local address, as well as a factory default service set identifier (SSID) and/or a Secure Shell (SSH) key. The new device may be network device 104 or network device 105 in FIG. 1, depending on whether it joins an already existing network zone or if it joins a new network zone.

In a first example, when network device 104 joins the network 100 (and powers on), it is assigned (e.g., by a controller device or network administrator, not shown in FIG. 1) to Zone A learned from the handshake mechanism established with the already "running" device. Network device 106, which previously joined the network 100, is also assigned to Zone A. Thus, in this example, since there is already a network device present in the network device zone to which network device 104 is assigned, network device 104 communicates with network device 106 (e.g., via a data cable shown at reference numeral 120 in FIG. 1) to obtain an authorization key from network device 106. The authorization key may be, for example, an Extensible Authentication Protocol (EAP) key that contains information indicating the network device zone to which network device 106 (and now network device 104) belongs. In this example, the EAP key indicates that network device 106 belongs to Zone A. Upon receiving the EAP key, the network device 104 sends the configuration request message 200 to the management device 102 via the wireless link 108 and/or the power line communication link 110. The configuration request message 200 is a broadcast request message that is used to present the virtual console-port to the management device 102, as described above.

As shown in FIG. 2, the configuration request message 200 comprises a default address field 202. The default address field 202 lists the default IP address of network device 104 that is derived from a media access control (MAC) address based on factory settings of network device 104. Optionally, the default address field 202 may comprise the SSID and/or SSH key for the network device 104. The communication request message 200 also has a zone identifier (ID) field 204 that indicates the network device zone in which network device 104 is located. The network device 104 obtains this information from the EAP key received from the network device 106. Additional information, such as the device type, software versions, interface numbers, etc., may also be included within the message 200. In the example above, the zone ID field 204 will contain the zone ID for Zone A. The configuration request message 200 also has a "first device in zone" (FDIZ) flag field 206. The FDIZ flag field 206 can be one of two values. For example, if the FDIZ flag field 206 is set to a value of "0" (representing a "false" logical state), it is an indication the network device 104 is not the first device assigned to the network device zone that is identified in the zone ID field 204. Conversely, if the FDIZ flag field 206 is set to a value of "1" (representing a "true" logical state), it is an indication that the network device 104 is the first device assigned to the network device zone that is identified in the zone ID field 204. In the example above, since network device 104 was physically connected to network device 106 and since network device 104 received the EAP key from network device 106, network device 104 sets the FDIZ flag field 206 to "0," since it is not the first device in Zone A. The configuration request message also includes the EAP key 208, which network device 104 received from network device 106. The configuration request message may be, for example if no IP address preassigned, a Dynamic Host Control Protocol (DHCP) request message sent to the management device 102 with a requested network device zone being a default shared network device zone In a second example, when network device 105 joins the network 100 (and powers on), it is not connected to any network device that already exists in the network 100. Thus, network device 105 is assumed to be a first device to install in a new network device zone (e.g., Zone B in FIG. 1). Network device 105 broadcasts the configuration request message 200, described above, using its preconfigured default IPv6 link-local address, but sets the FDIZ flag field 206 to a "true" value to indicate that it is the first device in the new network zone. Additionally, the configuration request message 200 sent by the network device 105 has a "no" or negative indication in the EAP key field 208, which implies to the management device 102 (upon receiving the message 200) that network device 105 is in a new network device zone (since it did not receive an EAP key from another network device).

After network device 104 (in the first example)/network device 105 (in the second example) generates the configuration request message 200 and broadcasts the message to the management device 102, the management device 102 receives the communication request message 200. The management device 102 validates the EAP key (if it is present). If an EAP key is not present, the management device 102 authenticates and authorizes the new network device securely. The management device 102 then sends a configuration message back to network device 104 that enables a secure communication between it and the new network device. Additionally, the management device 102 adds the new device into a database (e.g., database 118 or another database) as either a new member for Zone A (in the first example with network device 104) or a new member for Zone B (in the second example with network device 105). The management device 102 may store additional new devices that later join Zone A and Zone B into this database, thus aggregating all virtual console-ports for each new device. The management device 102 also limits the access of a network device zone (e.g., Zone A and Zone B) by using a role-based access control (RBAC) authentication approach to maintain the security of a network device (existing or new) in Zone A and Zone B. Therefore, only the network administrator (e.g., network team) that owns or has access rights to Zone A or Zone B can access the devices in Zone A or Zone B respectively (e.g., using an SSH session). It should be appreciated that a "super" network administrator may be given access rights to multiple network device zones (i.e. Zone A+Zone B+Zone C . . . etc.). After network device 104/network device 105 joins the network 100, the network administrator can log onto the newly added network device via the secure virtual console-port and can configure it in a secure mode (encrypted) as if it was a physical console-port.

Figure 3A:
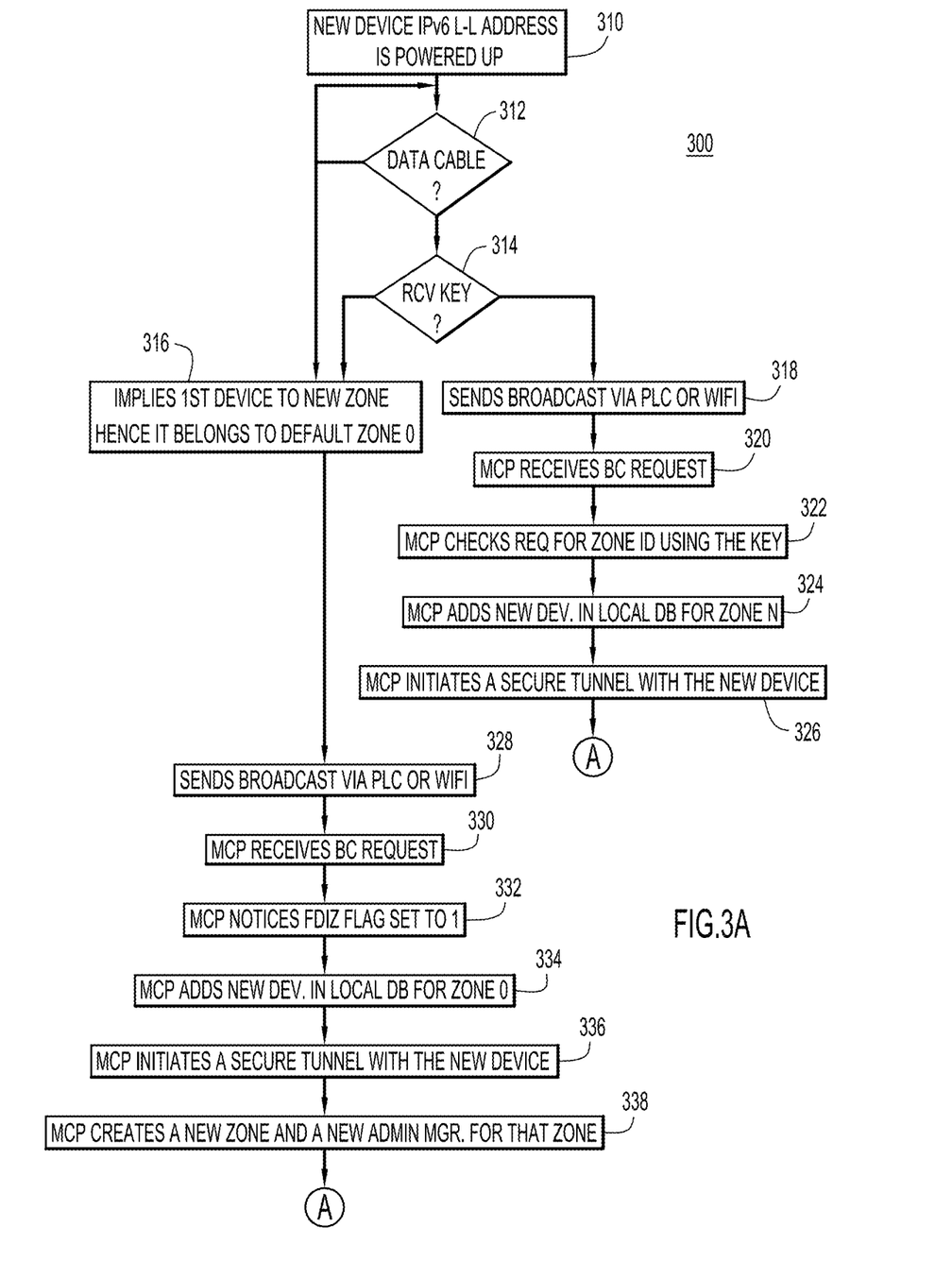
FIGS. 3A and 3B show example flow charts depicting operations of the management device configuring newly added devices that have preconfigured IPv6 Link-Local addresses.
Figure 3B:
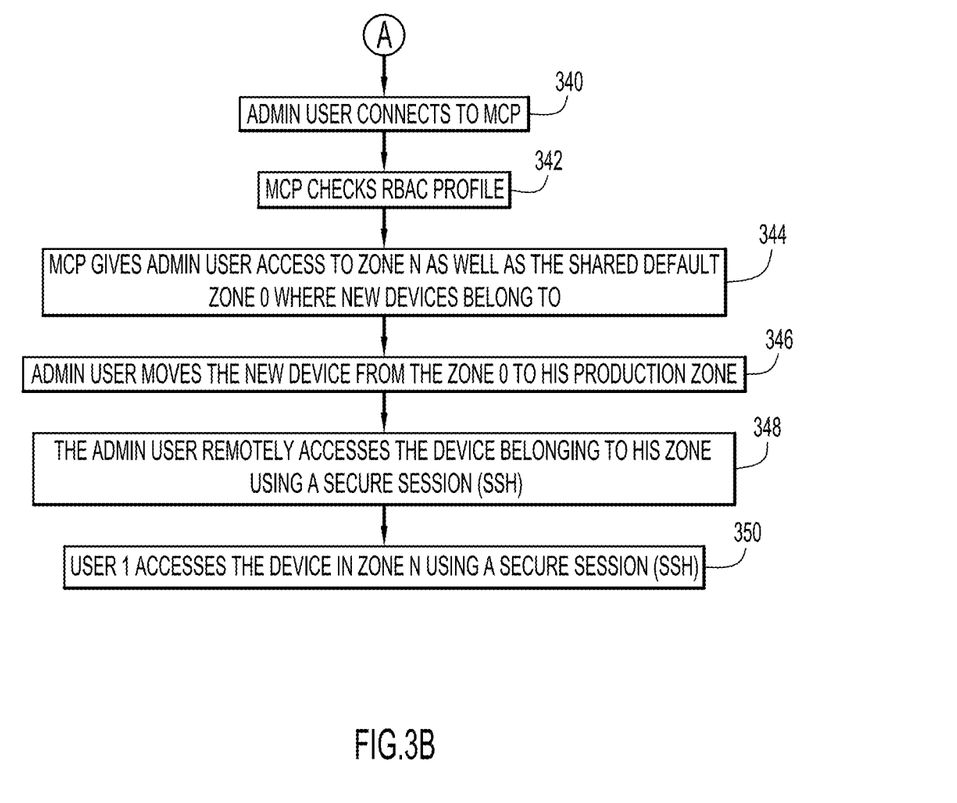

Reference is now made to FIGS. 3A and 3B. FIGS. 3A and 3B depict example flow charts 300 that show operations of the management device 102 configuring newly added network devices in the first scenario (where the network devices have preconfigured IP addresses). At operation 310, a new device (e.g., network device 104 or network device 105) with a link-local ("L-L" or "IPv6 link-local address") address is added to the network and is powered on. A determination is made by the management device 102 at operation 312 as to whether a data cable is connected to the new device. If so, a determination is made by the management device 102 at operation 314 as to whether the new device has received an authentication key (e.g., an EAP key). If a data cable is not connected to the new device and/or if the new device has not received an authentication key, at operation 316 (implies First Device in Zone—FDIZ=1), a determination is made by the management device 102 that the new device is the first device in a network device zone, referred to a "Zone 0" (e.g., the network device is network device 105 in FIG. 1). Zone B in FIG. 1 is an example of "Zone 0."

If an authentication key has been received, at operation 318, the new device (e.g., network device 104 in FIG. 1) sends a broadcast configuration request message 200 via the wireless link 108 or the power line link 110. At operation 320, the management device 102 receives the request message 200, and at operation 322, the management device 102 checks the request for the zone identifier using the EAP key. At operation 324, the management device adds the new device in a local database to associate the new device in the existing network device zone that it joined (e.g., Zone A in FIG. 1), and at operation 326, the management device 102 initiates a secure tunnel with the new device. This secure tunnel becomes therefore the Virtual Console Port replacing the original physical Console Port.

In the instance when the network device was determined in operation 316 to be a new network device in a new network zone (network device 105), at operation 328, the new network device sends the broadcast configuration request 200, and the management device 102, at operation 330, receives the request 200. At operation 332, the management device 102 determines that the FDIZ flag in the request 200 is set to a "true" value, and accordingly, in operation 334, the management device 102 adds the new device in a local database for the new network device zone (e.g., Zone B). At operation 336, the management device 102 initiates a secure tunnel with the new device, and at operation 338, it creates a new zone and a new administrative manager for that zone.

Reference is made to FIG. 3B which continues flow chart 300 at reference numeral A. At operation 340, the administrative manager connects to the management device 102, and at operation 342, the management device 102 checks the RBAC profile of the new device. At operation 344, the management device 102 provides access to the administrative manager to the network zones where the new device(s) have been added. The administrative user, at operation 346, moves the new device from these network zones to the production zones, and the administrative user, at operation 348, remotely accesses the devices belonging to these zones using a SSH protocol. At operation 350, a user may access the device using the SSH protocol.

Figure 4:
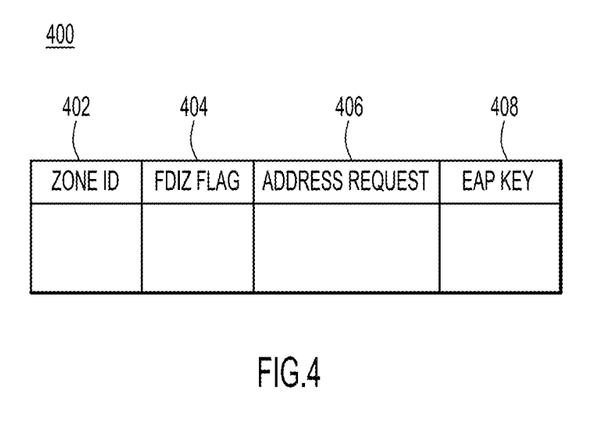
FIG. 4 shows an example of a configuration request message that is exchange between a network device without a preconfigured address and the management device.

Second Scenario:

As stated above, in a second scenario, a new network device may join a network without having a preconfigured IP address. Thus, in this scenario, the new device (network device 104 or network device 105 in FIG. 1) sends the configuration request message 400 shown in FIG. 4, which is now referenced. FIG. 4 shows an example of configuration request message 400 that is sent to the management device 102 by a new device that does not have a preconfigured IP address that joins the network 100. As stated above in the first scenario, the new device may join the network in an already existing network device zone (e.g., network device 104) or may join the network in a new network device zone as a first network device (e.g., network device 105).

FIG. 4 shows a configuration request message 400 that is similar to the configuration request message 200. In particular, the configuration request message 400 has a Zone ID field 402, a FDIZ flag field 404 and an EAP key field 408, similar to those described above in connection with FIG. 2. The configuration message 400, however, does not have a default address field, and instead, it has an address request field 406. The configuration request message 400 does not have a default address field since the new device is not preconfigured with a default IP address. Thus, when the new device sends the configuration request message 400 to the management device 102, the management device 102 assigns the new device an IP address (e.g., an IPv4) address from the database 114 containing a list or "pool" of usable IP addresses. Aside from being assigned an IP address, the new device sends the configuration request message 400 to the management device 102, and receives the response from the management device 102, in a similar manner as that described above in connection with FIG. 2 and FIGS. 3A and 3B.

Figure 5A:
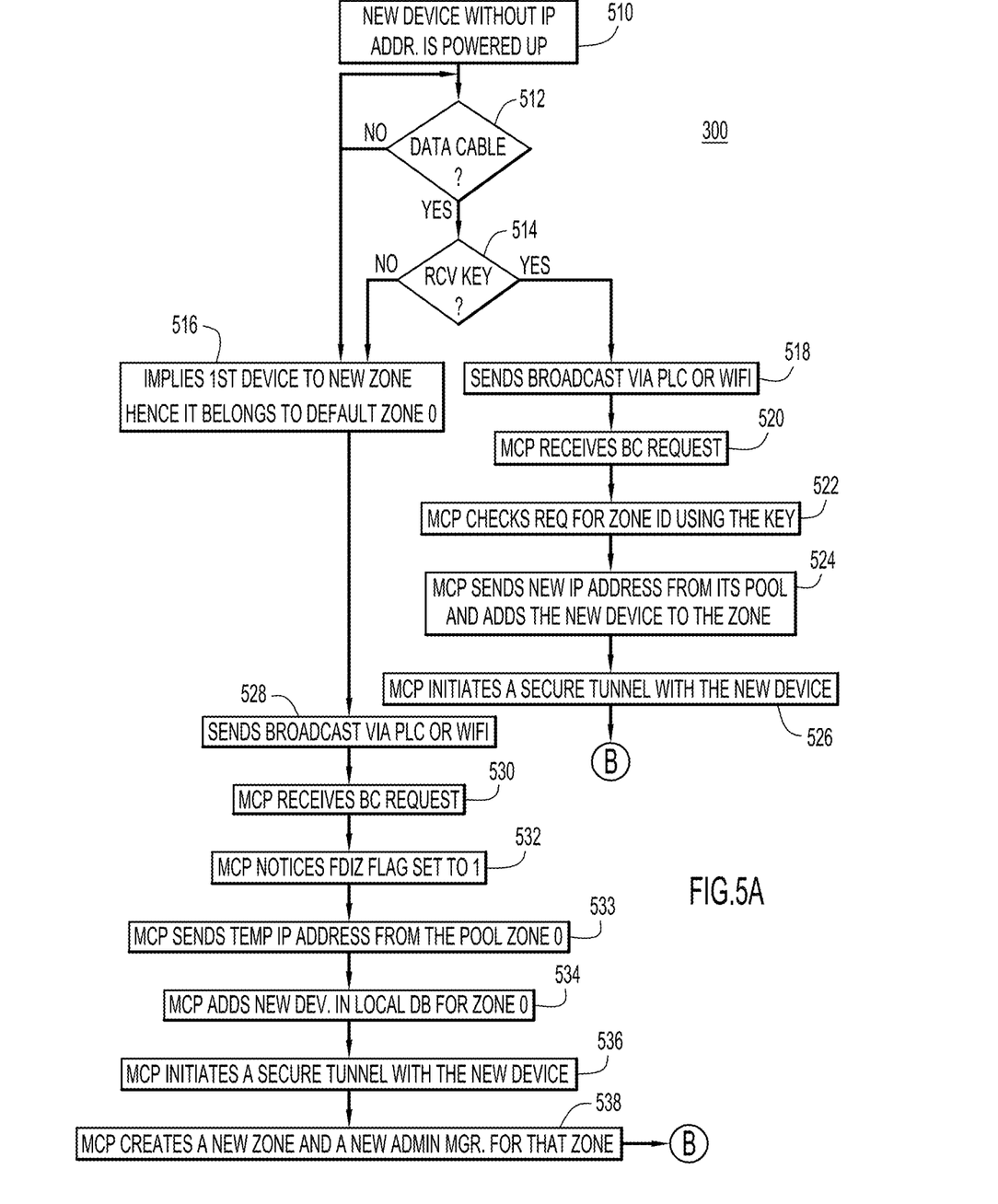
FIGS. 5A and 5B show example flow charts depicting operations of the management device configuring newly added devices that do not have preconfigured addresses.
Figure 5B:
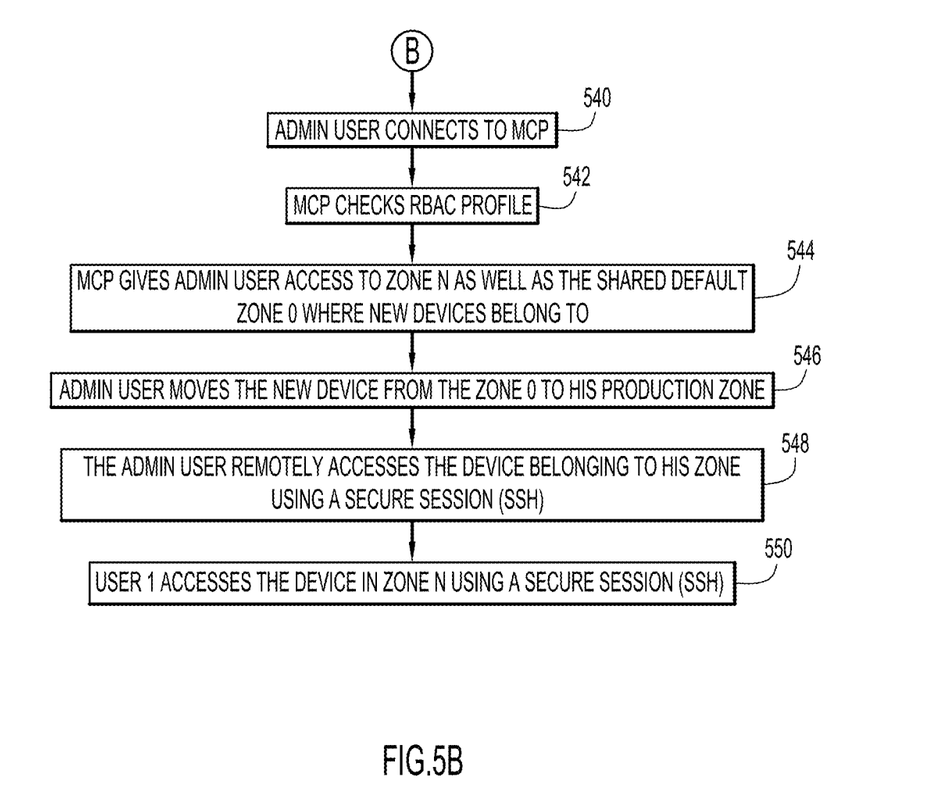

Reference is made to FIGS. 5A and 5B which depict example flow charts 500 that show operations of the management device 102 configuring newly added network devices in the second scenario (where the network devices do not have preconfigured IP addresses). At operation 510, a new device without an IP address is added to the network and is powered on. Operations 512 to 522 are similar to operations 312 to 322 described in FIG. 3A. At operation 524, the management device sends a new IP address (e.g., assigned from the database 118) and adds the new device to the network device zone according to the Zone ID field and FDIZ flag field embedded within the message 400. Operations 526 to 532 are similar to operations 326 to 332 described in FIG. 3A. At operation 533, the management device sends a temporary IP address from the database 118 to the new device. The flow chart 500 in FIG. 5A is continued at reference "B" in FIG. 5B, where operations 534 to 538 are similar to operations 334 to 338 described in FIG. 3A. Referring to FIG. 5B, operations 540 to 550 are similar to operations 340 to 350 described in FIG. 3B, above.

When the new device 105 joins the network 100 (and powers on), it is assigned to Zone B (e.g., by a controller device or network administrator not shown in FIG. 1). Since network device 105 is the only device assigned to Zone B, it is not connected to another network device in Zone B. The DHCP request message 300 contains a zone ID field 302 that contains the default network device zone, an FDIZ flag field 304 that is set to a value of "1" (or "true") and an address request field 406 that requests an IP address from the management device 102 (if network device 105 does not have a preconfigured IP address). Additionally information may be added to the DHCP request message 400 indicating a device type, version code, previous configuration flag, etc.

It should be appreciated that only the network administrator (e.g., network team) that owns or has access rights to default Zone 0 can access the devices in Zone 0 (e.g., using an SSH session). It should be appreciated that a super network administrator may be given access rights to multiple network device zones as stated above. For example, after network device 105 joins the network 100, the network administrator can log onto network device 105 via the secure virtual console-port and can configure network device 105 in a secure mode (encrypted) as if it was a physical console-port. Additionally, the network administrator can create new zones and can move new devices into new network device zones of interest. After a user authentication (e.g., RBAC), the network administrator responsible for the new network device zone logs into a particular zone and can observe and configure existing devices that belong to this network device zone.

Figure 6:
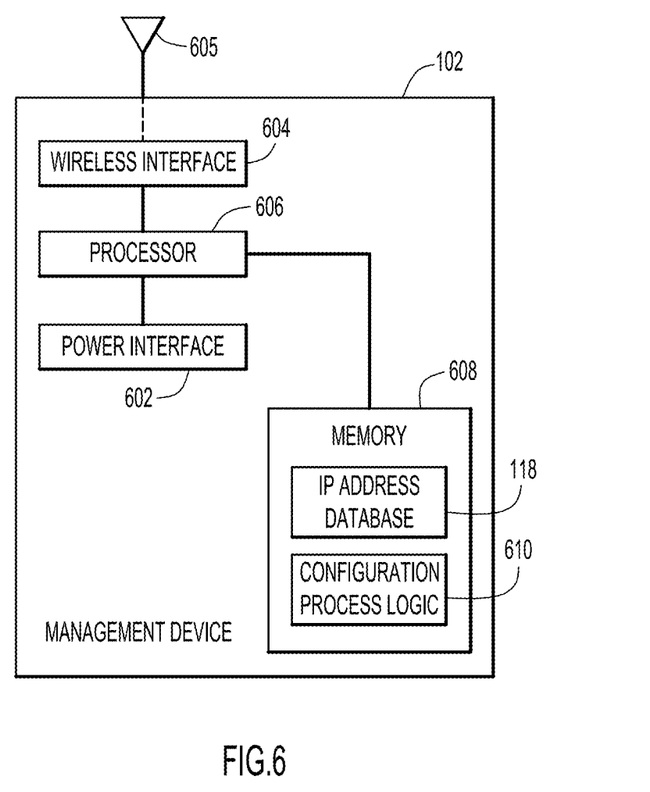
FIG. 6 shows an example block diagram of the management device.

Reference is now made to FIG. 6. FIG. 6 shows an example block diagram of the management device 102 that configures the network devices in the network 100. The management device 102 comprises, among other components, a power interface unit 602, a wireless interface unit 604, an antenna 605, a processor 606 and a memory unit 610. The power interface unit 602 is configured to interface with the power line communication link 110 to deliver AC power or DC power to the network device and to send configuration messages to the network devices. Likewise, in another embodiment, the wireless interface unit 604 is configured to send configuration messages to the network devices via the antenna 605.

The power interface unit 602 and the wireless interface unit 604 are coupled to the processor 606. The processor 606 is, for example, a microprocessor or microcontroller that is configured to execute program logic instructions (i.e., software) for carrying out various operations and tasks of the management device 102, as described above. For example, the processor 606 is configured to execute configuration process logic 610 to configure the network devices with IP addresses, according to the techniques described above. The configuration process logic 610 also instructs the processor 606 to update the IP address database 118, described above, whenever a new device joins the network 100. The functions of the processor 606 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 608 may comprise read only memory (ROM), random access memory (RAM), magnetic disk storage media devices, optical storage media devices, flash memory devices, electrical, optical, or other physical/tangible (non-transitory) memory storage devices. The memory 608 stores software instructions for the configuration process logic 610. The memory 608 also may store the IP address database 118 that, as described above, stores a pool of IP addresses for different network device zones. Thus, in general, the memory 608 may comprise one or more computer readable storage media (e.g., a memory storage device) encoded with software comprising computer executable instructions and when the software is executed (e.g., by the processor 606) it is operable to perform the operations described for the configuration process logic 610.

The configuration process logic 610 may take any of a variety of forms, so as to be encoded in one or more tangible computer readable memory media or storage device for execution, such as fixed logic or programmable logic (e.g., software/computer instructions executed by a processor), and the processor 606 may be an ASIC that comprises fixed digital logic, or a combination thereof.

For example, the processor 606 may be embodied by digital logic gates in a fixed or programmable digital logic integrated circuit, which digital logic gates are configured to perform the configuration process logic 610. In general, the configuration process logic 610 may be embodied in one or more computer readable storage media encoded with software comprising computer executable instructions and when the software is executed operable to perform the operations described hereinafter.

Figure 7:
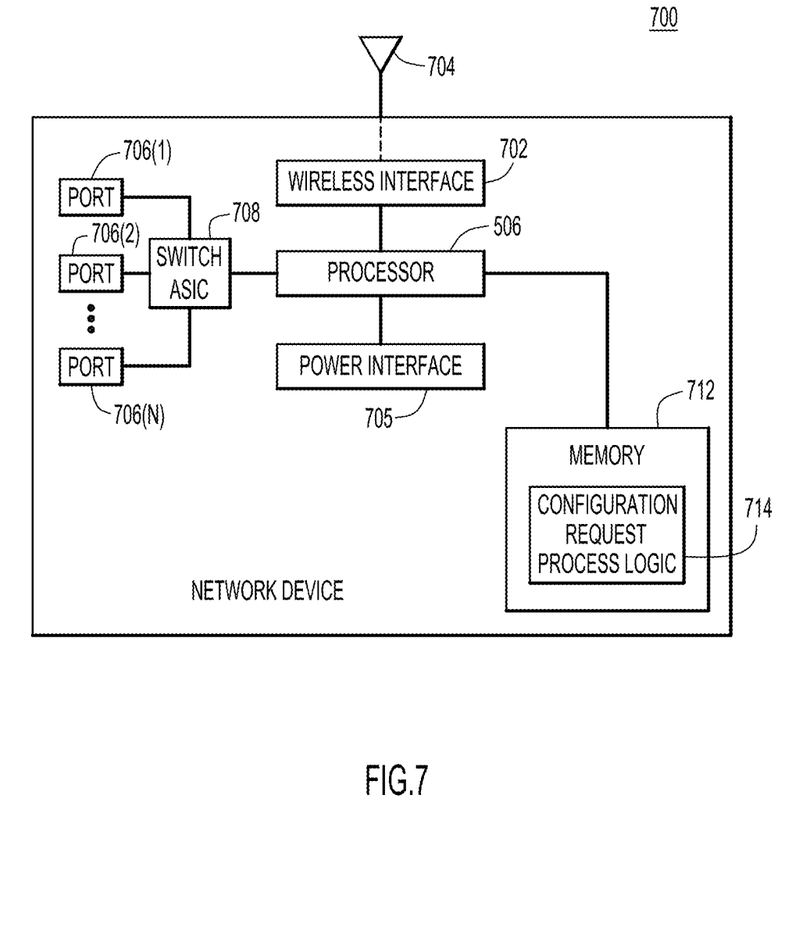
FIG. 7 shows an example block diagram of a network device configured to participate in the configuration techniques presented herein.

Reference is now made to FIG. 7. FIG. 7 shows an example block diagram of a network device at reference numeral 700. The network device 700 may represent any of the network devices in the network 100 (e.g., network device 104, 105 and/or 106). The network device 700 comprises, among other components, a wireless interface unit 702, an antenna 704, a power interface unit 705, a plurality of ports 706(1)-706(n), a switch ASIC 708, a processor 710 and a memory 712. The wireless interface unit 702 is configured to send configuration request messages to the management device 102 via the antenna 704, as described above. The power interface unit 705 is configured to interface with the power line communication link 110 to receive AC power or DC power delivered by the management device 102. Furthermore, the power interface unit 705 interfaces with the power line communication link 110 to send configuration request messages to the management device 102 and to receive configuration messages form the management device 102.

The plurality of ports 706(1)-706(n) may be physical console-ports that are configured to interface with data cables to communicate with any of the network devices in the network 100. For example, one or more of the ports 706(1)-706(n) may interface with a data cable (e.g., the data cable 120 in FIG. 1) to exchange communications. The ports 706(1)-706(n) are coupled to the switch ASIC 708, which is configured to route data communications received by the network device 700 and sent by the network device 700. The wireless interface 702, power interface 705 and switch ASIC 708 are coupled to the processor 710. The processor 710 is, for example, a microprocessor or microcontroller that is similar to that described in connection with FIG. 6 above, and configured to execute program logic instructions (i.e., software) for carrying out various operations and tasks of the network device 700, as described above. For example, the processor 710 is configured to execute configuration request process logic 714 stored in memory 712 to request an address assignment from the management device 102, according to the techniques described above.

The memory 712 may be similar in form to memory 608 described above, and may comprise read only memory ROM, RAM, magnetic disk storage media devices, optical storage media devices, flash memory devices, electrical, optical, or other physical/tangible (non-transitory) memory storage devices. The memory 712 stores software instructions for the configuration request process logic 714. The configuration request process logic 714 may take any of a variety of forms so as to be encoded in one or more tangible computer readable memory media or storage device for execution, such as fixed logic or programmable logic (e.g., software/computer instructions executed by a processor).

It should be appreciated that the techniques described above in connection with all embodiments may be performed by one or more computer readable storage media that is encoded with software comprising computer executable instructions to perform the methods and steps described herein. For example, the operations performed by the management device 102 may be performed by one or more computer or machine readable storage media (non-transitory) or device executed by a processor and comprising software, hardware or a combination of software and hardware to perform the techniques described herein.

In summary, a method is provided comprising: at a management device in a network, receiving a message from a new network device in the network via a wireless link between the management device and the new network device or a power line communication link between the management device and the new network device; classifying the new network device as belonging to one of a plurality of network device zones based on evaluating the message; and sending a response message to the new network device via the wireless link or the power line communication link to ensure secure access to a virtual console-port is provided for the management device and network devices in the network device zones.

In addition, a method is provided comprising: at a first network device in a network, receiving a message from a second network device in the network, wherein the message includes an authentication key and a network device zone identifier; sending the message with the authentication key and the network device zone identifier to a management device in the network via a wireless link between the management device and the first network device or a power line communication link between the management device and the first network device; and receiving a response message from the management device in the network via the wireless link or the power line communication link to ensure secure access to a virtual console-port is provided for the management device and network devices in the network device zones.

Additionally, a method is provided comprising: at a network device in a network, sending a broadcast request message to a management device in the network via a wireless link between the management device and the network device or a power line communication link between the management device and the network device, wherein the broadcast request message comprises an indication that the network device is not assigned to a network device zone; and receiving from the management device a response message via the wireless link or the power line communication link, wherein the response message comprises address identifier information if the network device is not preconfigured with address information and information indicating a new network device zone to which the network device is assigned to ensure secure access to a virtual console-port is provided for the management device and the network device.

Furthermore, an apparatus is provided comprising: a wireless interface configured to enable wireless communications via a wireless link; a power interface configured to couple to a power line communication link; a wireless interface configured to enable wireless communications via a wireless link; a memory; and a processor coupled to the power interface, wireless interface and memory, and configured to: receive a message from a new network device in a network via the wireless link or the power line communication link; classify the new network device as belonging to one of a plurality of network device zones based on evaluating the message; and send a response message to the new network device via the wireless link or the power line communication link to ensure secure access to a virtual console-port is provided for network devices in the network device zones.

The above description is intended by way of example only. Various modifications and structural changes may be made therein without departing from the scope of the concepts described herein and within the scope and range of equivalents of the claims.

What is claimed is:

1. A method comprising:
   at a management device in a network: receiving a message from a network device in the network via a wireless link or a power line communication link between the management device and the first network device, the message including fields for:
   a "first device in zone" (FDIZ) flag to indicate if the network device is a first device in a network device zone;
   either a preconfigured device address or an address request;
   a zone identifier (ID); and
   either an authentication key or an indication of no authentication key;
   evaluating the received message fields, and responsive to the evaluating:
   if the evaluating determines that the FDIZ flag indicates the network device is a first device in a network device zone, and the zone ID is a default value for all network devices that are first to join any of a plurality of network device zones, classifying the network device into a default zone corresponding to the default value along with any other network devices that were first to join network device zones; and
   establishing a secure tunnel with the network device over the communication link for use by the management device as a virtual console-port.

2. The method of claim 1, further comprising:
   if the evaluating determines that the FDIZ flag indicates the network device is a first device in a network device zone, the zone ID is a default value for all network devices that are first to join network device zones, and the message includes an address request instead of a preconfigured address, and the indication of no authentication key:
   assigning a device address from a pool of addresses to the network device; and
   sending the device address to the network device.

3. The method of claim 1, further comprising:
   if the evaluating determines the FDIZ flag indicates that the network device is not a first device in a network device zone, and the message includes the preconfigured device address and the authentication key:
   authenticating the zone ID with the authentication key; and
   classifying comprises classifying the network device into an existing network device zone having the zone ID that is authenticated.

4. The method of claim 3, further comprising:
   if the evaluating determines that the FDIZ flag indicates the network device is not a first device in a network device zone, and the message includes the address request instead of the preconfigured device address, and the authentication key:
   assigning a device address from a pool of addresses to the network device; and
   sending the device address to the network device.

5. The method of claim 1, further comprising:
   if the evaluating determines that the FDIZ flag indicates the network device is not a first device in a network device zone, and the message includes the preconfigured address and the authentication key:
   authenticating the zone ID with the authentication key; and
   classifying comprises classifying the network device into an existing network device zone having the zone ID that is authenticated.

6. The method of claim 5, further comprising:
   if the evaluating determines that the FDIZ flag indicates the network device is not a first device in a network device zone, and the message includes the address request instead of the preconfigured address, and the authentication key:
   assigning a device address from a pool of addresses to the network device; and
   sending the device address to the network device.

7. A method comprising:
   at a network device in a network, sending a broadcast request message to a management device in the network via a wireless link between the management device and the network device or a power line communication link between the management device and the network device, wherein the broadcast request message comprises a "first device in zone" (FDIZ) flag set to indicate that the network device is a first device in a network device zone, an indication in an authentication key field that no authentication key is available, and a default zone identifier (ID) used by all network devices that are first devices in any of a plurality of network device zones;
   at the management device, receiving the broadcast request message, and responsive to the FDIZ flag setting in the received broadcast request message, classifying the network device into a default zone corresponding to the default zone ID along with any other network devices that were first to join network device zones;
   transmitting from the management device a response message via the wireless link or the power line communication link, wherein the response message comprises address identifier information responsive to the broadcast request message and information indicating a network device zone to which the network device is assigned to ensure secure access to a virtual console-port is provided for the management device and the network device; and
   receiving at the network device the response message from the management device.

8. The method of claim 7, wherein sending the message comprises sending an encrypted broadcast message via a secure wireless tunnel, and wherein receiving the response message comprises receiving the response message with the address identifier information and the network device zone information via the secure wireless tunnel.

9. The method of claim 7, wherein sending the message comprises sending an encrypted broadcast message via the power line communication link that is configured to carry traffic between the network device and the management device, and wherein receiving comprises receiving the response message with the address identifier information via the power line communication link.

10. The method of claim 7, further comprising:
    if the network device is not connected to a second network device already joined to the network, sending the broadcast request message to the management device such that the broadcast request message comprises the FDIZ flag set to indicate that the network device is the first device in a network device zone, the indication in an authentication key field that no authentication key is available, and the default zone; and if the network device is connected to the second network device already joined to the network, sending the broadcast request message to the management device such that the broadcast request message comprises the FDIZ flag set to indicate that the network device is not the first device in a network device zone, an authentication key instead of the indication of no authentication key, and a network device zone identifier of the network device zone to which the second device belongs.

11. An apparatus comprising:
a wireless interface configured to enable wireless communications via a wireless link;
a power interface configured to couple to a power line communication link;
a memory; and
a processor coupled to the power interface, wireless interface and memory, and configured to:
receive a message from a network device in a network via the wireless link or the power line communication link, the message including fields for:
a "first device in zone" (FDIZ) flag to indicate if the network device is a first device in a network device zone;
either a preconfigured device address or an address request;
a zone identifier (ID); and
either an authentication key or an indication of no authentication key;
evaluate the received message fields, and responsive to the evaluating:
matches
if the FDIZ flag indicates the network device is a first device in a network device zone, and the zone ID is a default value for all network devices that are first to join any of a plurality of network device zones, classify the network device into the default zone along with any other network devices that were first to join network device zones; and
establishing a secure tunnel with the network device over the communication link for use as a virtual console-port.

12. The apparatus of claim 11, wherein the processor is further configured to:
if the FDIZ flag indicates the network device is a first device in a network device zone, the zone ID is a default value for all network devices that are first to join network device zones, and the message includes an address request instead of a preconfigured address, and the indication of no authentication key:
assign a device address from a pool of addresses to the network device; and
send the device address to the network device.

13. The apparatus of claim 11, wherein the processor is further configured to:
if the FDIZ flag indicates the network device is not a first device in a network device zone, and the message includes the preconfigured device address and the authentication key:
authenticate the zone ID with authentication key; and
classify the network device into an existing network device zone having the authenticated zone ID.

14. The apparatus of claim 13, wherein the processor is further configured to:
if the FDIZ flag indicates the network device is not a first device in a network device zone, and the message includes the address request instead of the preconfigured device address, and the authentication key:
assign a device address from a pool of addresses to the network device; and
send the device address to the network device.

15. The apparatus of claim 11, wherein the processor is further configured to:
if the FDIZ flag indicates the network device is not a first device in a network device zone, and the message includes the preconfigured address and the authentication key:
authenticate the zone ID with the authentication key; and
classify the network device into an existing network device zone having the zone ID that is authenticated.

16. The apparatus of claim 15, wherein the processor is further configured to:
if the FDIZ flag indicates the network device is not a first device in a network device zone, and the message includes the address request instead of the preconfigured address, and the authentication key:
assign a device address from a pool of addresses to the network device; and
send the device address to the network device.

17. The apparatus of claim 13, wherein the processor is further configured to assign address identifier information comprising one of an Internet Protocol version 4 and an Internet Protocol version 6 address.

* * * * *